W. A. Coventry.
Self-Winding Clothes-Line Machine.
No. 95,002. Patented Sept. 21, 1869.
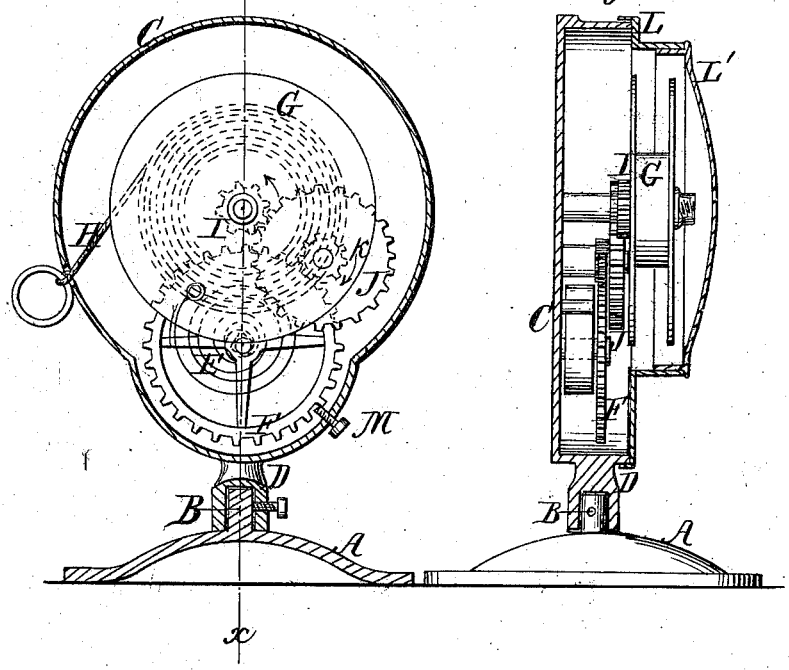
Witnesses;
A. W. Almquist
W. F. Clark
Inventor;
W. A. Coventry
Per Munn & Co.
Attys

United States Patent Office.

WILLIAM A. COVENTRY, OF PATERSON, NEW JERSEY.

Letters Patent No. 95,002, dated September 21, 1869.

IMPROVED SELF-WINDING LINE-MACHINE.

The Schedule referred to in these Letters Patent and making part of the same.

To all whom it may concern:

Be it known that I, WILLIAM A. COVENTRY, of Paterson, in the county of Passaic, and State of New Jersey, have invented a new and useful Improvement in Self-Winding Clothes-Line Machines; and I do hereby declare that the following is a full, clear, and exact description thereof, which will enable others skilled in the art to make and use the same, reference being had to the accompanying drawings, forming part of this specification.

This invention relates to a new and useful improvement in an apparatus for automatically winding up a cord or clothes-line; and consists in arranging a coil spring and gearing in a suitable case, so that the act of drawing out the cord shall revolve the gearing and the spring, while by the recoil of the spring the cord is wound up, as will be hereinafter more fully described.

In the accompanying drawing—

Figure 1 is a front elevation of the machine, with the front portion of the case removed, showing the spring and the arrangement of the gear-wheels.

Figure 2 is a vertical cross-section through the line $x\ x$.

Similar letters of reference indicate corresponding parts.

A is the base-plate, which is fastened to the top of a box or pedestal, with a pivot, B, in its centre.

C is the main case, which contains the spring and the gear-wheels.

This is a casing with a socket-neck, D, which socket sets over the pivot B, as seen in the drawing. In this manner the machine is supported in an upright position, and allowed to revolve or adjust itself to suit the position of the cord.

To prevent the socket from rising, the pivot may be grooved, and a set-screw or pin may pass through the socket and into the groove, as seen in the drawing.

E is a coil spring, one end of which is attached to the back of the case C, and the other end to the shaft of the gear-wheel F.

G is a drum or box-pulley, on a central shaft, around which pulley the cord H is wound.

The end of the cord being attached to this pulley, and the cord wound on the pulley, as seen in the drawing, motion is imparted to the wheel F by drawing out the cord and revolving the pulley by means of the pinion I, wheel J, and pinion K, which latter engages with the wheel F, the revolution of which coils or winds up the spring.

The spring may be coiled, or sufficient tension may be given it to wind up the cord, before the cord is attached to the pulley.

A weight, suspended by a cord from the shaft of the wheel F, and extending downward into a hollow box, will produce the same result.

Instead of placing the machine on a pedestal, it may be constructed more especially for in-door use, and be fastened by screws to the side of the room, so that the line can be extended and passed around or over hooks for its support, as in out-door use.

The cord and the operating parts of the machine are secured from the weather when out of doors, and at all times, by means of the outer casing L L', made in two parts.

M is a pin or screw, holding the gearing.

The cord passes out through holes in the two parts, and the cord may be grasped and held in the holes by slightly moving the outer or circular portion of the case L'.

Having thus described my invention,

I claim as new, and desire to secure by Letters Patent—

The combination and arrangement of the back case C with the socket-neck D, pivot base A, spring E, gear-wheels F and T, pinions I and K, and pulley G, constructed and operating substantially as shown and described, and for the purposes set forth.

The above specification of my invention signed by me, this 11th day of August, 1869.

WM. A. COVENTRY.

Witnesses:
GEO. W. MABEE,
EDWARD MARTIN.